No. 649,760. Patented May 15, 1900.
R. RUETSCHI.
FLUID PRESSURE PRESS.
(Application filed June 27, 1899.)

(No Model.) 5 Sheets—Sheet 1.

WITNESSES: INVENTOR
Rudolph Ruetschi
BY
ATTORNEYS

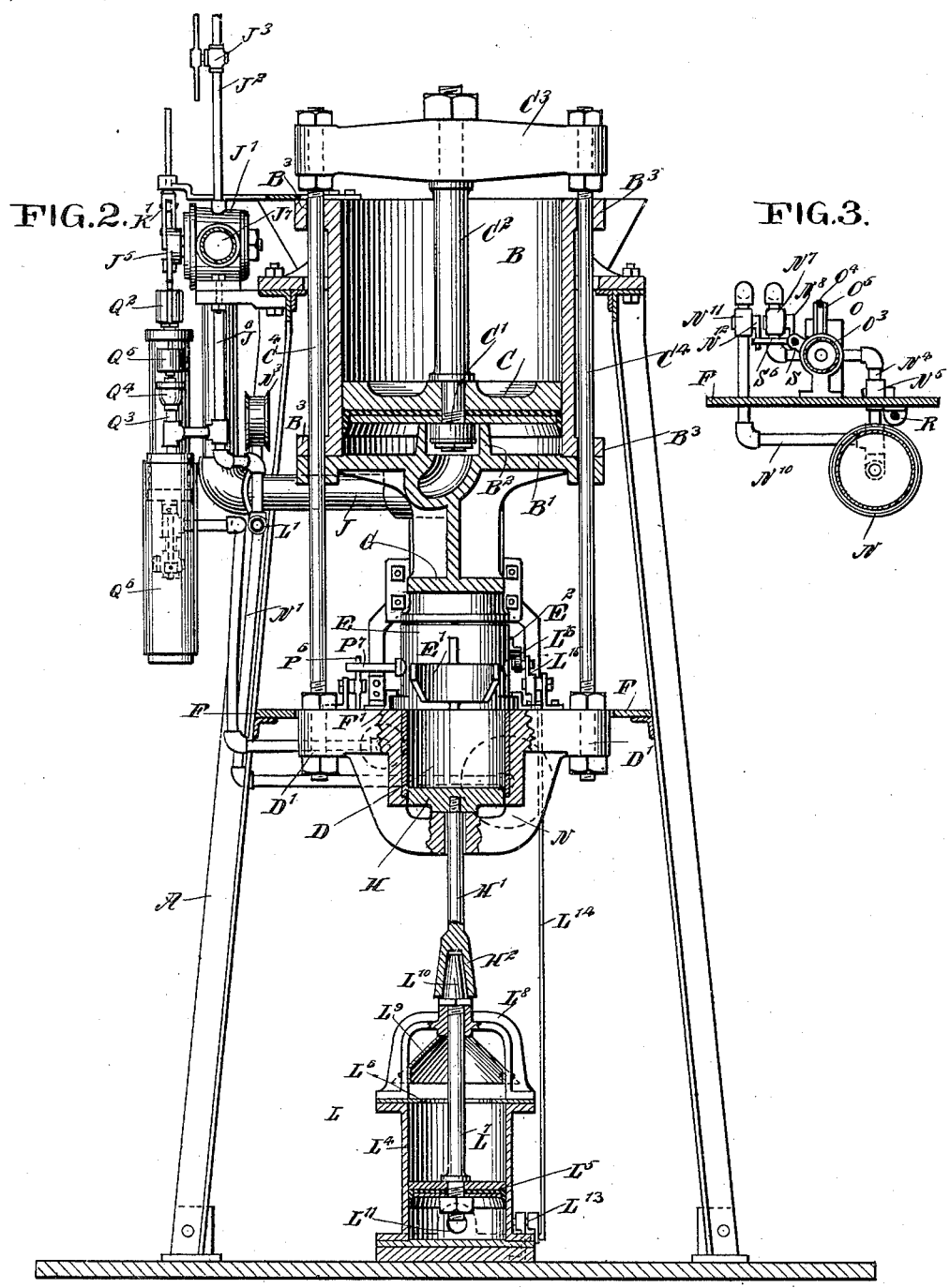

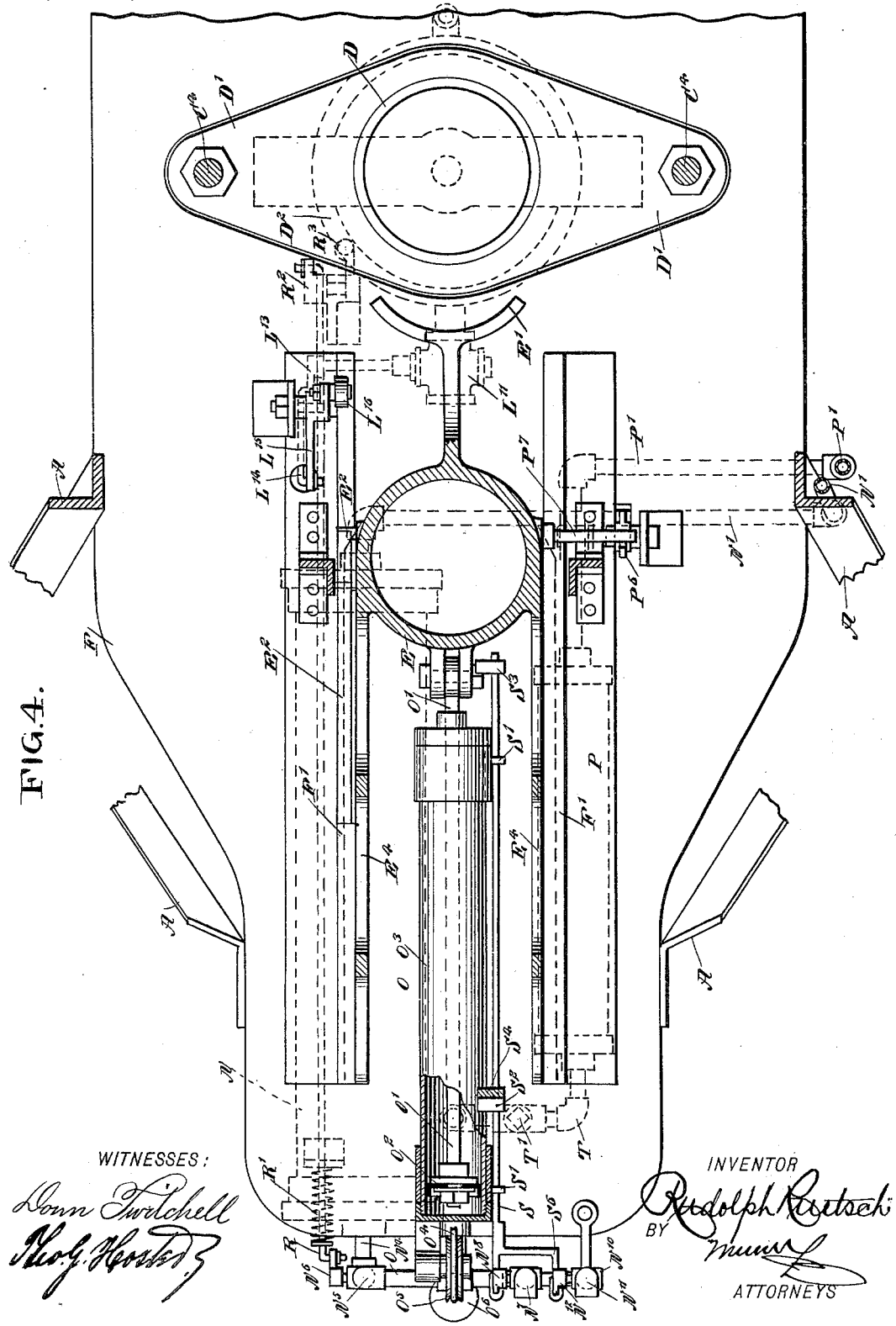

No. 649,760. Patented May 15, 1900.
R. RUETSCHI.
FLUID PRESSURE PRESS.
(Application filed June 27, 1899.)
(No Model.) 5 Sheets—Sheet 4.

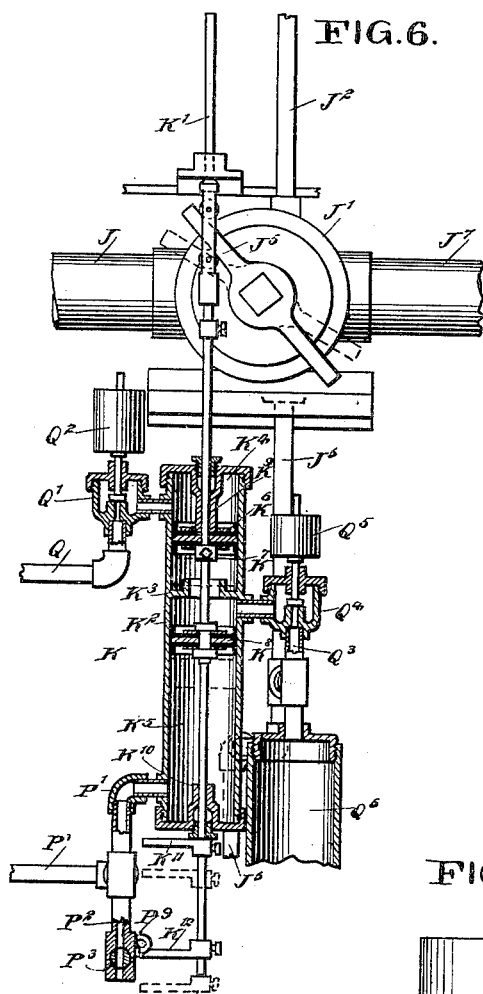
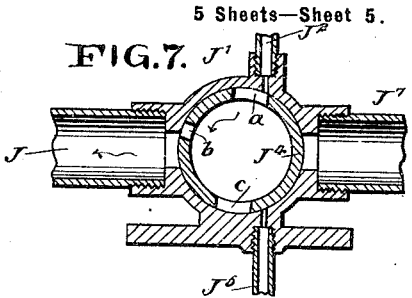
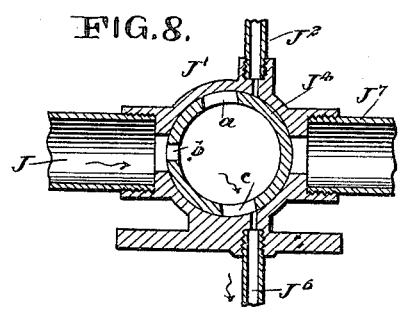
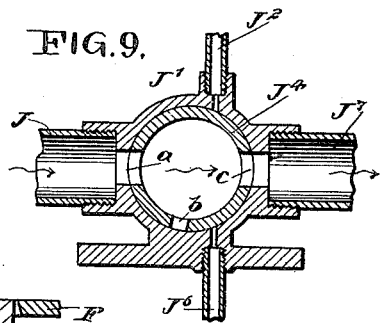
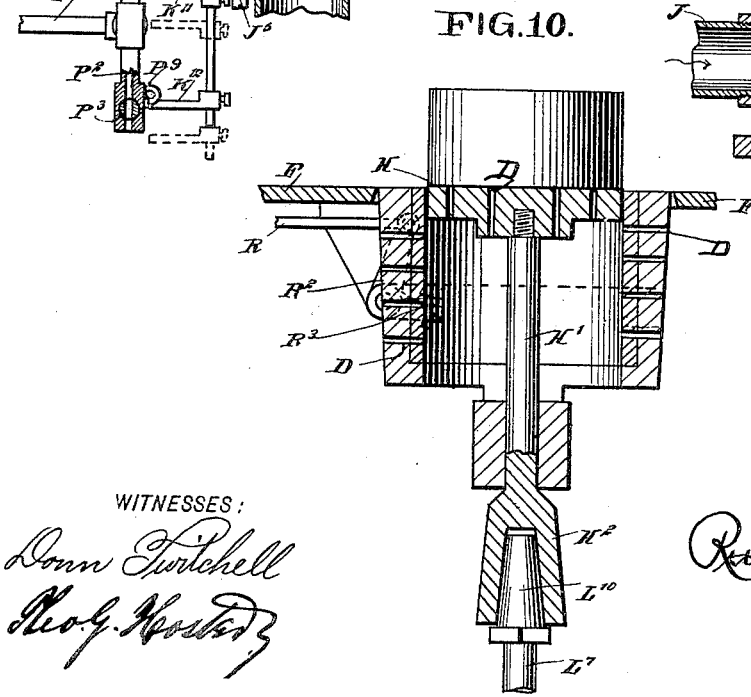

UNITED STATES PATENT OFFICE.

RUDOLPH RUETSCHI, OF ARGENTINE, KANSAS.

FLUID-PRESSURE PRESS.

SPECIFICATION forming part of Letters Patent No. 649,760, dated May 15, 1900.

Application filed June 27, 1899. Serial No. 722,063. (No model.)

*To all whom it may concern:*

Be it known that I, RUDOLPH RUETSCHI, of Argentine, in the county of Wyandotte and State of Kansas, have invented a new and Improved Fluid-Pressure Press, of which the following is a full, clear, and exact description.

The object of the invention is to provide a new and improved fluid-pressure press for pressing dry and wet materials into bricks, briquets, and like articles in a very simple and economical manner and without the aid of skilled labor, the press being completely automatic in its operation and arranged to form the articles of a uniform and predetermined strength, the controlling power being a fluid under pressure, such as compressed air, steam, or the like.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
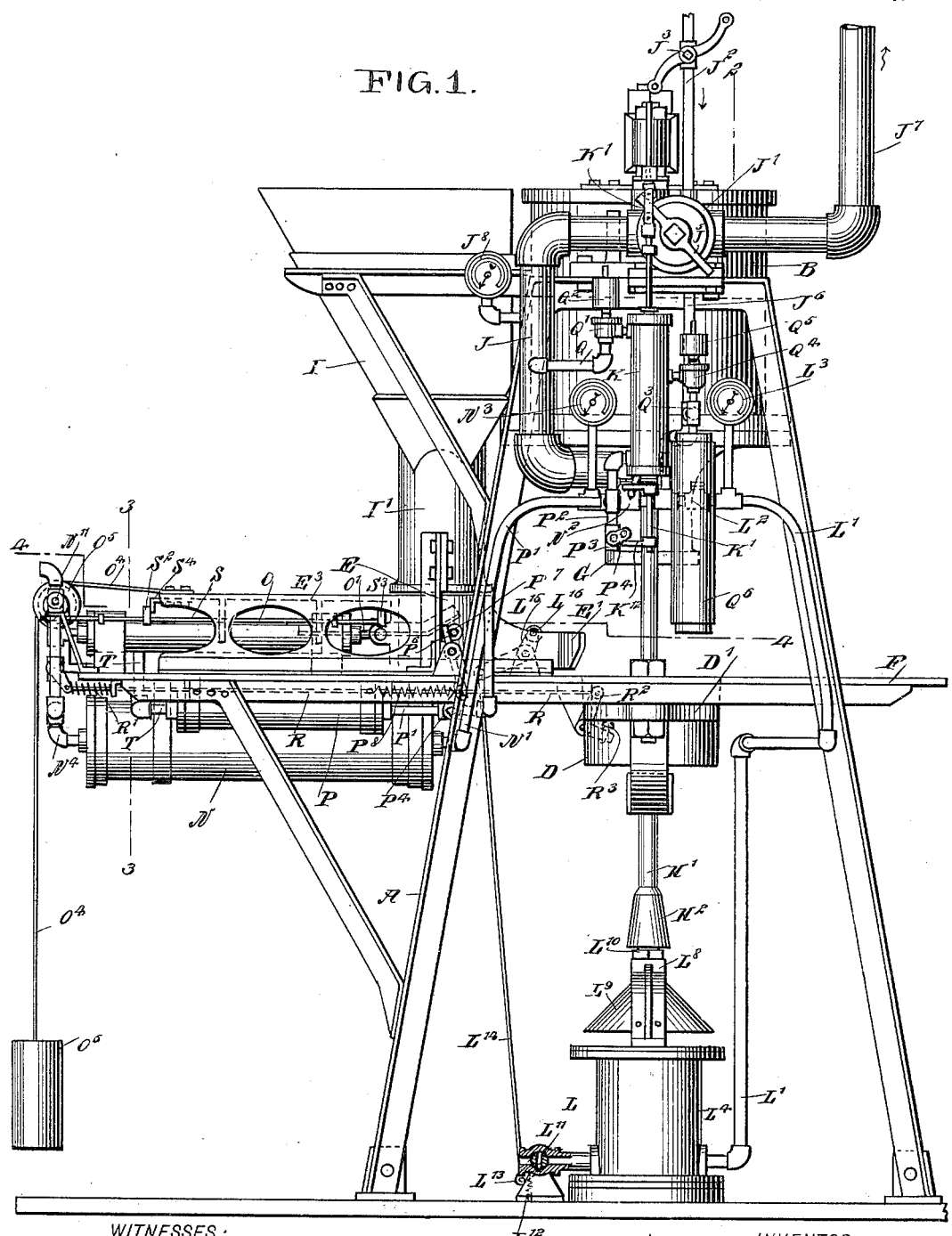
Figure 5:
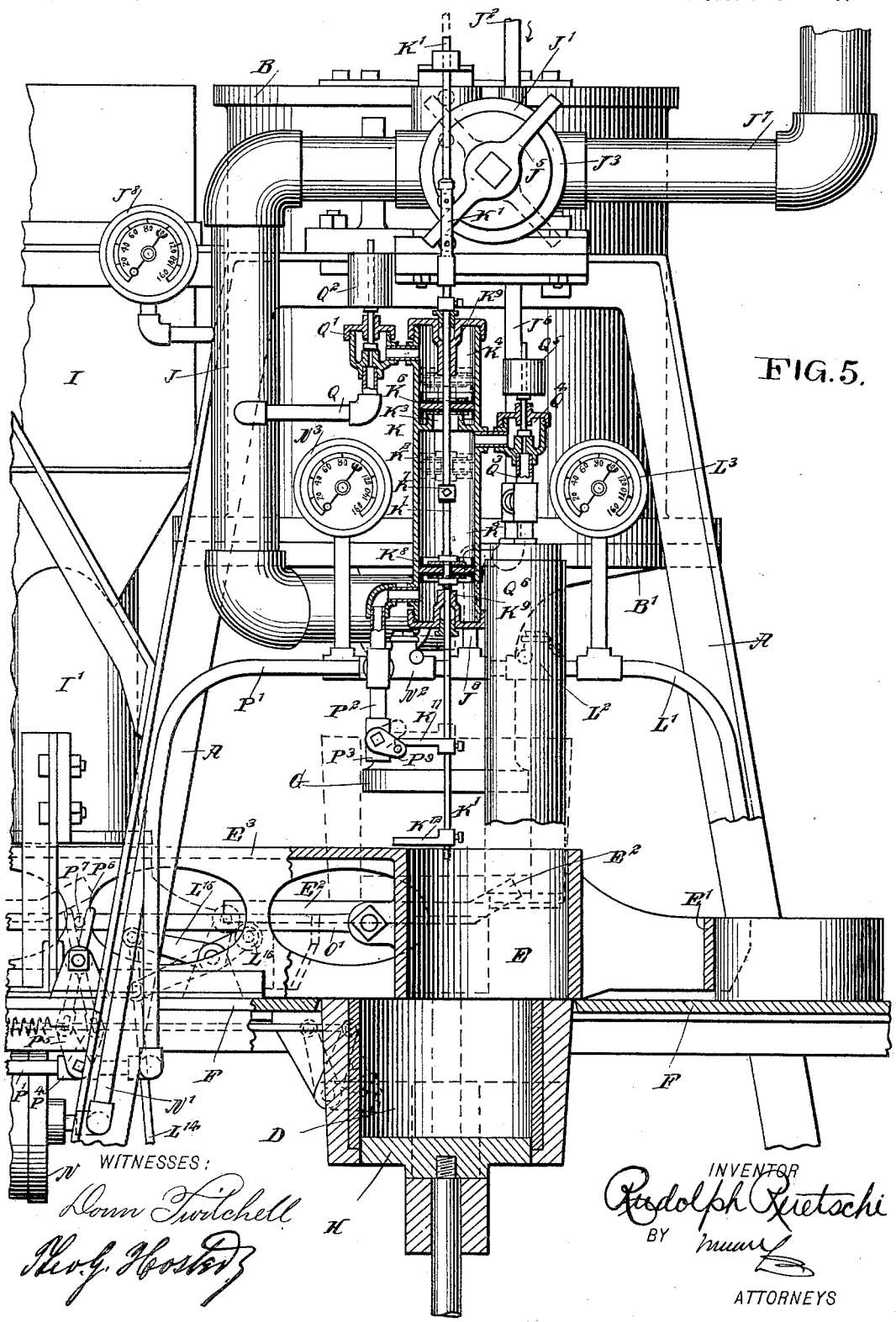

Figure 1 is a side elevation of the improvement. Fig. 2 is a transverse section of the same on the line 2 2 in Fig. 1. Fig. 3 is a like view of part of the same on the line 3 3 in Fig. 1. Fig. 4 is an enlarged sectional plan view of the improvement on the line 4 4 in Fig. 1. Fig. 5 is an enlarged side elevation of the improvement with parts in section and with parts in a different position from that shown in Fig. 1. Fig. 6 is an enlarged sectional side elevation of the controlling device for the four-way valve. Figs. 7, 8, and 9 are enlarged sectional side elevations of the four-way valve with the valve-plug in different positions, and Fig. 10 is an enlarged sectional side elevation of the mold with the plunger in an uppermost position.

In the improved press, hereinafter more fully described in detail, I use as a controlling power a fluid under pressure—such as compressed air, steam, &c.—and which fluid under initial pressure actuates a piston to bodily move a mold and the material filled therein, so as to compress the material against a fixed platen and form the desired article, the fluid being then allowed to actuate secondary devices under reduced expansion for removing the finished article, filling a second batch of material into the mold, cutting off the initial pressure, and releasing the actuating devices at the proper time, to bring said devices back to a normal starting position, and to again turn on the initial pressure to automatically repeat the performance.

As shown in the drawings, the press is mounted on a suitable framework A, carrying in its upper portion a vertically-disposed cylinder B, in which reciprocates a piston C, supporting a mold D, into which the material is dropped from a receptacle E, having a reciprocating motion in a longitudinal direction over a fixed table F, with which the open top of the mold is flush at the time the piston and the mold are in their lowermost or starting positions. The piston C upon moving upward under the initial pressure of the fluid carries the mold D in a like direction to finally bring the material contained in the mold against a fixed platen G, entering the mold as the latter rises, so that the material is formed into the desired article, which latter is ejected from the mold during the last part of the return movement of the mold by a vertically-movable plunger H, forming the bottom of the mold, the article being pushed from the top of the mold to one side of the table by a pusher E', secured to and moving with the now advancing receptacle E, carrying a second quantity of material from a fixed hopper I to the mold D.

In detail the construction is as follows:

The cylinder B is open at the top, (see Fig. 2,) and its lower end is closed by a head B', formed at its inner face with a cup $B^2$, into which extends a small plunger C', formed on the under side of the piston C and secured to the stem $C^2$ of said piston by a suitable nut and washer, the under face of the piston C resting on the top edge of the cup $B^2$ when the piston is in a lowermost position, as shown in Fig. 2, and the plunger C' extends loosely in the said cup. The upper end of the piston-rod $C^2$ is provided with a cross-head $C^3$, on which are adjustably secured downwardly-extending rods $C^4$, mounted to slide in suitable guideways $B^3$, arranged on the cylinder B. The lower ends of the rods $C^4$ are adjustably connected with lugs $D'$, projecting from the sides of the mold D, so that when the piston C is moved upward in the cylinder B then the piston carries the mold D in a like direction and moves the same upon the platen G, which preferably forms an integral part of the head $B'$ of the cylinder. When the piston C moves downward, the mold D is carried in a like direction, and when the piston is in a lowermost position, as shown in Fig. 2, then the top of the mold D is flush with the top of the table F.

Into the bottom of the cup $B^2$, previously referred to, opens a fluid-pressure pipe J, connected with a four-way valve $J'$, into which leads a supply-pipe $J^2$, connected with a suitable source of fluid-pressure supply and containing a valve $J^3$, under the control of the operator, for opening and closing the pipe $J^2$ whenever it is desired to run or stop the press. The four-way valve $J'$ is shown in detail in Figs. 7, 8, and 9, and the means for automatically controlling said valve is more particularly shown in detail in Figs. 5 and 6.

The construction of the valve is as follows: The plug $J^4$ of the valve $J'$ is provided with three ports $a\ b\ c$ for making proper connections between the supply-pipe $J^2$ and the cylinder-pipe J, as shown in Fig. 7, or for connecting said cylinder-pipe J with a distributing-pipe $J^6$, as shown in Fig. 8, or for connecting the cylinder-pipe J with an exhaust-pipe $J^7$, as indicated in Fig. 9. The stem of the valve-plug $J^4$ carries at its outer end an arm $J^5$, engaged by the stem $K'$ of a valve-controlling device K, hereinafter more fully described in detail, said controlling device serving to move the valve-plug $J^4$ into the several positions above referred to to insure an automatic working of the press. The distributing-pipe $J^6$ connects with the pipes $L'$ and $N'$, of which the pipe $L'$ forms part of the controlling device L for the mold-plunger H, and the pipe $N'$ connects with one end of a storage-reservoir N, preferably located under the table F, as illustrated in the drawings. The pipe $L'$ is provided with a check-valve $L^2$, between which and the controlling device is arranged a gage $L^3$ for indicating the pressure of the fluid for said controlling device. In the pipe $N'$ is arranged a similar check-valve $N^2$, and adjacent to it is a gage $N^3$ for indicating the pressure of the motive agent for the storage-reservoir N, and a gage $J^8$ is arranged in the pipe J for indicating the initial pressure passing to the cylinder B. The check-valves $L^2$ and $N^2$ allow the passage of the fluid to the controlling device L and the reservoir N, but prevent a return flow from the same. The storage-reservoir N serves to supply motive agent to the controlling device O for the mold-filling receptacle E, and said device O is arranged to admit during a certain period some of the fluid to an auxiliary storage-reservoir P, connected with the valve-controlling device K to cause a return movement of the parts thereof, so as to shift the valve-plug $J^4$ back to the starting position shown in Fig. 7 to again admit fluid from the supply-pipe $J^2$ to the pipe J and the cylinder B.

The valve-controlling device (shown in detail in Figs. 5 and 6) is provided with a vertically-disposed cylinder $K^2$, formed with a transverse seat or ring-shaped partition $K^3$, dividing the cylinder into an upper compartment $K^4$ and a lower compartment $K^5$. In the upper compartment $K^4$ is mounted to reciprocate a piston $K^6$, held loosely on the stem $K'$ and adapted to rest on a collar $K^7$, secured by a set-screw to the stem $K'$, the collar being of a size to allow its passage through the opening in the seat $K^3$ when the stem moves downward or upward, as hereinafter more fully described, for shifting the plug $J^4$ of the valve $J'$. In the lower compartment $K^5$ is arranged to reciprocate a piston $K^8$, rigidly secured to the stem $K'$, so that the piston and stem move together. The top of the loose piston $K^6$ is adapted to be seated when in an uppermost position on the inner end of a somewhat-depending stuffing-box $K^9$ for the top head of the cylinder, while the downward movement of the piston $K^8$ is limited by a similar stuffing-box $K^{10}$ on the lower head for the cylinder $K^2$. The extreme upper end of the compartment $K^4$ is connected by a pipe Q with the pipe J, and in this pipe Q is arranged a relief-valve $Q'$, carrying a weight $Q^2$, adjusted to open at a desired pressure, and the upper end of the compartment $K^5$ is connected by a pipe $Q^3$ with the pipe $J^6$, and in this pipe $Q^3$ is arranged a relief-valve $Q^4$, the weight $Q^5$ of which is adjusted to allow the valve to open upon reduced expansion-pressure. Thus the weight $Q^2$ for the relief-valve $Q'$ is adjusted to rise at a pressure below the initial pressure recorded by the gage $J^8$—say ninety pounds—while the weight $Q^5$ is adjusted to open the valve $Q^4$ at a maximum reduced pressure, recorded on the gages $L^3$ and $N^3$ and somewhat under fifty-five pounds. The pipe $Q^3$ is preferably connected with a small storage-cylinder $Q^6$ for preventing a sudden concussion of the relief-valve $Q^4$ by a sudden expansion of pressure from the large cylinder B to relieve the valve $Q^4$ and the pipes $L'$ and $N'$ and the parts connected therewith. The lower end of the compartment $K^5$ is connected by a pipe $P'$ with the auxiliary reservoir P, and said pipe $P'$ is provided with an outlet-pipe $P^2$, containing a valve $P^3$, the valve-stem of which carries an arm $P^9$, adapted to be engaged by arms $K^{11} K^{12}$, adjustably secured by set-screws on the lower end of the stem $K'$. When the valve $P^3$ is open, the lower compartment $K^5$ can discharge by way of the pipe $P^2$ to the open air, and when the valve is closed the fluid can pass from the auxiliary reservoir P by way of the pipe $P'$ into the lower compartment $K^5$ to act on the piston $K^8$, then in a lowermost position, as shown in Fig. 5, to force the piston $K^8$ and the stem $K'$ back into an uppermost position to reset the valve-plug $J^4$ at starting position, as shown in Fig. 7. In the starting position shown in Fig. 6 the piston $K^6$ abuts against the stuffing-box $K^9$, and the valve-plug $J^4$ is now held in such a position that the ports $a$ and $b$ establish communication between the pipes $J^2$ and $J$, so that the initial pressure can pass to the lower end of the cylinder B to slowly start the piston C upward for the piston to leave its seat on the cup $B^2$ and allow the pressure against the full under surface of the piston to move said piston to a final uppermost position, and thus carry the mold D along to press the material therein at the fixed platen G and form the desired article. The pressure also passes by way of the pipe Q and its relief-valve $Q'$ into the upper end of the compartment $K^4$ to exert pressure against the piston $K^6$ and push the latter downward, and with it the stem $K'$, to cause the stem to act on the arm $J^5$, so as to turn the valve-plug $J^4$ from the position shown in Fig. 7 to that shown in Fig. 8. When this takes place, the port $a$ is cut off from the supply-pipe $J^2$ and the port $b$ is in full register with the pipe J and the port $c$ registers with the pipe $J^6$, so that the supply of fluid to the valve $J'$ is cut off, while the fluid in the cylinder B and pipe J can now flow backward through the valve-plug $J^4$ to the pipe $J^6$ and be distributed from the latter under reduced pressure to the controlling device L and the storage-reservoir N by way of the check-valves $L^2$ and $N^2$ and the pipes $L'$ and $P'$. The fluid can also pass from the pipe $J^6$ by way of the pipe $Q^3$ and relief-valve $Q^4$ into the upper end of the lower compartment $K^5$ to act on the piston $K^8$ and move the latter, with the stem $K'$, downward to the position shown in Fig. 5. In doing so the stem $K'$, by acting on the arm $J^5$, shifts the valve-plug $J^4$ from the position shown in Fig. 8 to the position shown in Fig. 9, so that the pipes $J^2$ and $J^6$ are cut off from the interior of the valve-plug $J^4$, while the ports $a$ and $c$ register with the pipes J and $J^7$, respectively, to allow the fluid in the pipe J to exhaust to the outer air. The fluid under reduced pressure in passing the check-valve $L^2$ and through the pipe $L'$ finally enters the lower end of the cylinder $L^4$ of the controlling device L, in which is mounted to reciprocate a piston $L^5$, the upward movement of which is limited by a ring $L^6$, extending over the open upper end of the cylinder $L^4$. The piston-rod $L^7$ for the piston $L^5$ extends loosely through the ring $L^6$ and is fitted to slide in a yoke $L^8$, attached to the top of the cylinder $L^4$ and carrying a cone-shaped hood $L^9$ for preventing dust, clay, or other loose material from passing into the open upper end of the cylinder $L^4$. The extreme upper end of the piston-rod $L^7$ is provided with a cone-shaped head $L^{10}$, adapted to engage a correspondingly-shaped socket $H^2$, formed on the plunger-rod $H'$ of the plunger H. Now the fluid passing into the lower end of the cylinder $L^4$ at the time mentioned causes the piston $L^5$ to move upward with its stem $L^7$, so that when the mold D, with its plunger H, moves downward after the material is pressed, as above described, and the exhaust takes place from the cylinder B through the pipes J $J^7$ then the socket $H^2$ finally moves in engagement with the head $L^{10}$, so that the plunger H is held stationary during the last portion of the return movement of the mold D, whereby the pressed article is pushed out of the mold D. (See Fig. 10.) When the mold reaches its lowermost position and is flush with the top of the table F, then the top of the plunger H is likewise flush with the upper end of the mold and the table and at the same time supports the article, which is now pushed from said plunger by the advancing pusher $E'$ of the receptacle E. When the article is nearly pushed out of the plunger H, then the fluid in the lower end of the cylinder $L^4$ is exhausted through an exhaust-valve $L^{11}$, automatically opened at this time, so that the said plunger H immediately returns by its own weight to a lowermost or bottom position in the mold D, and a like return movement of the piston $L^5$ and its piston-rod $L^7$ takes place. The valve $L^{11}$ is normally held in a closed position by a spring $L^{12}$ pressing an arm $L^{13}$ on the valve-stem. (See Fig. 1.) The arm $L^{13}$ is connected by a link $L^{14}$ with a bell-crank lever $L^{15}$, fulcrumed on the top of the table and provided with a friction-roller $L^{16}$, projecting into the path of a cam $E^2$, carried on the outside of the receptacle E, (see Figs. 2 and 4,) so that when the receptacle advances and the pusher $E'$ has nearly pushed the finished article off the plunger H, as previously mentioned, then the cam $E^2$ acts on the friction-roller $L^{16}$ to impart a swinging motion to the bell-crank lever $L^{15}$, whereby the link $L^{14}$ imparts a swinging motion to the arm $L^{13}$ against the tension of the spring $L^{12}$ to open the valve $L^{11}$, so as to allow the fluid to exhaust from the cylinder $L^4$, as above described.

The receptacle E is provided with a rearwardly-extending plate $E^3$ for closing the under side of the spout $I'$ of the hopper I after the receptacle is filled with material from the hopper and moves forward to deliver the material into the mold D, as previously mentioned. By this arrangement the spout $I'$, which is preferably cylindrical and of the same internal diameter as the receptacle E, is kept closed during the forward and backward movement of the receptacle. The receptacle E is further provided with longitudinally-extending flanges $E^4$, fitted to slide in suitable guideways $F'$, formed on the top of the table F, as illustrated in Fig. 4.

In order to impart a forward movement to the receptacle E by pressure from the storage-reservoir N, the said receptacle is pivotally connected at its rear end with a piston-rod $O'$, (see Fig. 4,) carrying a piston $O^2$, mounted to reciprocate in a cylinder $O^3$, all forming part of the controlling device for said receptacle E. The piston $O^3$ is forced forward by pressure from the reservoir N to move the receptacle E from under the spout I' to and over the mold D, and the return movement of said receptacle is caused by a rope $O^4$, secured to the plate $E^3$ and passing over a pulley $O^5$, a weight $O^6$ being on the lower end of said rope. The outer end of the cylinder $O^3$ is connected with the outer end of the storage-reservoir N by a pipe $N^4$, (see Figs. 1, 3, and 4,) and in this pipe is arranged a valve $N^5$ for connecting or disconnecting the reservoir N and said cylinder $O^3$. The stem $N^6$ of the valve $N^5$ is connected with a rod R, mounted to slide in suitable bearings under the table F and pressed on by a spring R'. (Shown in Fig. 4.) The rod R is pivotally connected with a bell-crank lever $R^2$, fulcrumed under the table F, adjacent to the mold D, and said bell-crank lever is provided with a set-screw $R^3$, the head of which is adapted to be engaged by a flange $D^2$ on the mold D at the time the latter moves into a lowermost position. When this takes place, the rod R is moved into a forward position against the tension of its spring R', and the valve $N^5$ is then opened. Now when the mold is lifted by the upward movement of the piston C, as previously mentioned, then the flange $D^2$ of the mold, by moving away from the set-screw $R^3$, releases the bell-crank lever $R^2$ and allows the spring R' to impart an outward sliding movement to the rod R, so that the valve $N^5$ is closed by the rod acting on the arm $N^6$ of the said valve $N^5$. When the mold returns, as previously mentioned, it engages the set-screw $R^3$ and imparts a swinging motion to the bell-crank lever $R^2$ to cause the rod R to slide and open the valve $N^5$, so that the fluid under pressure and previously passed into the reservoir N can now flow from the same to the pipe $N^4$ and open the valve $N^5$ to the outer end of the cylinder $O^3$ to act on the piston $O^2$ thereof, so as to push the receptacle E from under the spout I' and forward over the table F upon the mold D, which is by this time in a lowermost position, as well as its plunger H, it being understood that the pusher E' is a sufficient distance in advance of the receptacle E, and the article previously formed is moved over the plunger H, and the latter is returned to a lowermost position before the receptacle begins to register with the mold to deliver its contents to the same. The pipe $N^4$ is also provided with an exhaust-valve $N^7$ for allowing part of the fluid to escape from the cylinder $O^3$ during the return stroke of the piston $O^2$, and this exhaust-valve $N^7$ has its stem $N^8$ connected with a rod S, fitted to slide longitudinally in bearings S', attached to the cylinder $O^3$. On the rod S are secured collars $S^2$ $S^3$, adapted to be alternately engaged by a lug $S^4$, secured to and depending from the plate $E^3$, (see Figs. 1 and 4,) so that the valve $N^7$ is closed in the last portion of the return stroke of the receptacle E and its plate $E^3$ and is opened in the latter period of the forward stroke of the receptacle.

In order to insure a quick exhaust of the fluid in the reservoir N at the time the receptacle E is on the back stroke, a pipe $N^{10}$ is provided leading from the pipe $N^4$ below the valve $N^5$ and containing an exhaust-valve $N^{11}$, the stem $N^{12}$ of which is engaged by an arm $S^6$, projecting from the rod S. Thus when the latter is actuated both valves $N^7$ and $N^{11}$ are simultaneously opened or closed to allow the fluid to escape from the reservoir N as well as from the cylinder $O^3$.

The auxiliary reservoir P is charged from the cylinder $O^3$ when the piston $O^2$ has traveled a sufficient distance forward to pass beyond and uncover a pipe T, leading from near the outer end of the cylinder $O^3$ to the outer end of said auxiliary reservoir P. The pipe T is provided with a check-valve T' for preventing a return flow of the fluid from the reservoir to the cylinder.

In order to control the flow of the fluid from the auxiliary reservoir P to the lower end of the compartment $K^5$ by way of the pipe P' at the time the valve $P^3$ is closed, the said pipe P' is for this purpose provided with a valve $P^4$, on the stem of which is secured an arm $P^5$, connected with a lever $P^6$, fulcrumed on a bracket carried by the table F, (see Figs. 1, 2, 4, and 5,) and the upper end of this lever $P^6$ projects into the path of a pin $P^7$, attached to one side of the receptacle E. A spring $P^8$ is connected with the lower end of the lever $P^6$ for holding the valve $P^4$ in a closed position when the receptacle E is moving forward to fill the mold. When the receptacle E is on the return stroke and nears the end thereof, then the pin $P^7$ moves in contact with the upper end of the lever $P^6$ to impart a swinging motion thereto and act on the arm $P^5$, so that the latter is swung against the tension of the spring $P^8$, and the valve $P^4$ is opened to allow the fluid to flow from the auxiliary reservoir P by way of the pipe P' into the lower end of the compartment $K^5$ to act on the piston $K^8$ therein and push the same upward to move the valve-plug $J^4$ back to its starting position. (Shown in Fig. 7.) As soon as the receptacle E moves forward then the pin $P^7$ moves away from the lever $P^6$ to allow the spring $P^8$ to act on the said lever and the arm $P^5$ to again close the valve $P^4$, so that the reservoir P can be charged with the fluid from the cylinder $O^3$ as soon as the piston $O^2$ has moved forward beyond the opening leading to the pipe P'.

The operation is as follows: When the several parts are in the position shown in Figs. 1, 2, 3, 4, 6, and 7 and the valve $J^3$ in the supply-pipe $J^2$ is open, then the fluid under pressure passes through the valve J' and pipe J into the cylinder B to move the piston C therein upward and lift the mold filled with material by a previous operation, so that the material is pressed by the platen G under initial pressure of the fluid. When this takes place, the fluid in the pipe J also passes through the pipe Q and relief-valve Q' into the upper compartment $K^4$ of the cylinder $K^2$ to move the piston $K^6$ on the stem $K'$ downward a short distance—that is, until the piston $K^6$ is seated on the seat $K^3$. By this movement the stem $K'$ shifts the valve-plug $J^4$ to move the port $a$ out of register with the pipe $J^2$ and to move the port $c$ in register with the pipe $J^6$, so that the fluid can now pass from the cylinder B by way of the pipe J and valve-plug $J^4$ into the pipe $J^6$ and from the latter by the pipe $L'$ to the cylinder $L^4$ of the controlling device L to move the piston $L^5$ therein into an uppermost position for the purpose mentioned. The fluid can also pass by way of the pipe $N'$ into the reservoir N for storing a portion of the fluid, and some fluid can also pass by way of the pipe $Q^3$ and the relief-valve $Q^4$ into the upper end of the compartment $K^5$ to act on the piston $K^8$ and force the latter downward and with it the stem $K'$ to turn the valve-plug $J^4$ into the position shown in Fig. 9. The fluid remaining in the pipe J and cylinder B can now exhaust by way of the pipe $J^7$ to the outer air, and the piston C and mold D consequently readily descend to their former positions. As the mold moves downward the pressed article is moved out of the mold by the plunger H, as previously explained. When the mold D moves into its lowermost position, it acts on the bell-crank lever $R^2$ to cause an opening of the valve $N^5$, so that the storage-reservoir N is connected with the outer end of the cylinder $O^3$, and consequently the fluid passes from the said reservoir into the said cylinder and pushes the piston $O^2$ forward, so that a forward sliding motion is given to the receptacle E, filled with material for charging the mold a second time. During the forward movement of the receptacle E the pusher $E'$ moves the finished article from the plunger of the mold to one side of the table F, after which the air is exhausted from the cylinder $L^4$, as above explained, so that the plunger H moves back to its normal lowermost position immediately previous to the receptacle E moving into register with the mold to refill the same. When the piston $O^2$ is moved forward a short distance and uncovers the pipe $P'$, then part of the fluid passes from said cylinder $L^4$ by way of the pipe T into the auxiliary reservoir P to fill the same. During the forward movement of the receptacle E the weight $O^6$ on the rope $O^4$ is drawn upward, and after the receptacle has registered with the mold and moved somewhat beyond (see Fig. 5) to give ample time for fully discharging its contents into the mold then the rod S is shifted to cause an opening of the valve $N^7$ and allow the fluid to escape from the cylinder $O^3$, so that the weight $O^6$ can draw the receptacle E and the parts carried thereby back to its rearmost normal position to again bring the receptacle E under the spout $I'$ to be refilled with material from the hopper I. During this return movement of the receptacle E the pin $P^7$ acts on the lever $P^6$ to open the valve $P^4$ and allow the fluid from the reservoir P to pass into the compartment $K^5$ to push the piston $K^8$ and with it the stem $K'$ back to an uppermost position to return the valve-plug $J^4$ to a starting position, as shown in Fig. 7.

The minor parts and their operation have already been pointed out above, so that a further description is not deemed necessary, it being, however, understood that the several devices are automatically actuated and at the proper time, so that no attention whatever is required on the part of the operator—that is, the above-described operation is successively and automatically repeated without aid from the operator.

When pressing wet or very moist material, it is desirable to perforate the upper portion of the side wall of the mold D, as well as the plunger H, to afford a ready escape for the moisture when the material is pressed. This construction is shown in Fig. 10.

Having thus fully described my invention, I claim as new and desire to secure by Letters Patent—

1. A fluid-pressure press, provided with primary devices for pressing the material under initial pressure of the fluid, and secondary devices controlled by the fluid expanded and reduced, substantially as shown and described.

2. A fluid-pressure press, provided with primary devices for pressing the material under initial pressure of the fluid, and a releasing device for the primary devices, to relieve the same of the pressure of the fluid, the said releasing device being controlled by the fluid under reduced pressure, substantially as shown and described.

3. A fluid-pressure press, provided with primary devices for pressing the material under initial pressure of the fluid, a valve for controlling the flow of the fluid to and from said primary devices, and a controlling device for said valve and actuated by reduced pressure of the fluid, substantially as shown and described.

4. A fluid-pressure press, provided with primary devices for pressing the material under initial pressure of the fluid, a valve for controlling the flow of the fluid to and from said primary devices, a controlling device for the said valve, and devices connected with the valve, for the fluid to pass in at reduced pressure from the primary devices, the said devices being connected with the controlling device for the valve, for actuating the valve-controlling device by the fluid at reduced pressure, substantially as shown and described.

5. A fluid-pressure press, provided with primary devices for pressing the material under initial pressure of the fluid, a valve for controlling the flow of the fluid to and from said primary devices, a controlling device for the said valve, devices connected with the valve, for the fluid to pass in at reduced pressure from the primary devices, the said devices being connected with the controlling device for the valve, for actuating the valve-controlling device by the fluid at reduced pressure, and secondary devices actuated by the fluid under reduced pressure, substantially as shown and described.

6. A fluid-pressure press, provided with primary devices for pressing the material under initial pressure of the fluid, a valve for controlling the flow of the fluid to and from said primary devices, a controlling device for the said valve, devices connected with the valve, for the fluid to pass in at reduced pressure from the primary devices, the said devices being connected with the controlling device for the valve, for actuating the valve-controlling device by the fluid at reduced pressure, secondary devices actuated by the fluid under reduced pressure, said secondary devices comprising a mold-filling device, and means for removing the pressed article from the primary pressing devices, substantially as shown and described.

7. A fluid-pressure press, provided with primary devices for pressing the material under initial pressure of the fluid, a valve for controlling the flow of the fluid to and from said primary devices, a controlling device for said valve, devices connected with the valve for the fluid to pass in at reduced pressure from the primary devices, the said devices being connected with the controlling device for the valve for actuating the valve-controlling device by the fluid at reduced pressure, secondary devices actuated by the fluid under reduced pressure, and a resetting device connected with the valve-controlling device for resetting the latter, substantially as shown and described.

8. A fluid-pressure press, provided with a mold and platen for pressing the material under initial pressure of the fluid, a cylinder containing a piston connected with the mold, a valve for controlling the flow of the fluid to and from said cylinder, and a valve-controlling device for actuating said valve and automatically controlled by said fluid, substantially as shown and described.

9. A fluid-pressure press, provided with a mold and platen for pressing the material under initial pressure of the fluid, a cylinder containing a piston connected with the mold, a valve for controlling the flow of the fluid to and from said cylinder, and a valve-controlling device for actuating said valve and automatically controlled by said fluid, said valve-controlling device having connection with the fluid under initial pressure and with the fluid under reduced pressure, for intermittently actuating the valve, substantially as shown and described.

10. A fluid-pressure press, provided with a mold and platen for pressing the material under initial pressure of the fluid, a cylinder containing a piston connected with the mold, a valve for controlling the flow of the fluid to and from said cylinder, a valve-controlling device for actuating said valve and automatically controlled by said fluid, and a relief-valve connection between said controlling device and the said valve at the initial-pressure side of the valve, substantially as shown and described.

11. A fluid-pressure press, provided with a mold and platen for pressing the material under initial pressure of the fluid, a cylinder containing a piston connected with the mold, a valve for controlling the flow of the fluid to and from said cylinder, a valve-controlling device for actuating said valve and automatically controlled by said fluid, a relief-valve connection between said controlling device and the said valve at the initial-pressure side of the valve, and a second relief-valve connection between the said controlling device and the said valve at the reduced-pressure side of the valve, substantially as shown and described.

12. A fluid-pressure press, provided with a mold and platen for pressing the material under initial pressure of the fluid, a cylinder containing a piston connected with the mold, a valve for controlling the flow of the fluid to and from said cylinder, and a valve-controlling device for actuating said valve and automatically controlled by said fluid, the said controlling device shifting the valve successively for connecting the fluid-supply with the cylinder and the controlling device, then the cylinder with the controlling device, and finally the cylinder with the open air, substantially as shown and described.

13. A fluid-pressure press, provided with primary devices for pressing the material under initial pressure of the fluid, a valve for controlling the flow of the fluid to and from the said pressing devices, a controlling device for the said valve and actuated successively by initial pressure of the fluid and reduced or expansion pressure of the fluid, and connections between the said valve and said controlling device whereby the latter is actuated by said fluid under reduced pressure after the fluid under initial pressure has been cut off from the controlling device, substantially as shown and described.

14. A fluid-pressure press provided with a mold having a reciprocating motion, a plunger forming the bottom of the mold, a cylinder located beneath the plunger, a piston in said cylinder and arranged to be actuated by fluid-pressure, and a piston-rod extending upward from said piston and having a free upper end, the said rod being adapted to be moved upward with the piston under the pressure of the fluid in the cylinder, whereby when the mold with its plunger moves downward the upper free end of said piston-rod engages the plunger to form a resistance for the same to cause a discharge of the article from the mold, substantially as shown and described.

15. A fluid-pressure press provided with a fixed platen, a mold movable to and from said platen, a plunger forming the bottom of the mold and having a downwardly-extending plunger-rod provided at its end with a socket, a cylinder located beneath the plunger, a piston in said cylinder actuated by fluid-pressure and a piston-rod extending upward from said piston and having a head adapted to engage the socket on the plunger-rod when the mold moves downward, whereby the plunger is held stationary to cause a discharge of the article from the mold, at the time the latter moves into a lowermost position, substantially as shown and described.

16. A fluid-pressure press, provided with a fixed platen, a mold movable to and from said platen, a plunger forming the bottom of the mold, a fluid-pressure device for said plunger, to cause a discharge of the article from the mold at the time the mold moves into a lowermost position, and a filling-receptacle for filling the mold, and carrying a pusher for moving the article from the plunger and mold, said receptacle controlling the exhaust of said fluid-pressure device, substantially as shown and described.

17. A fluid-pressure press provided with a mold having a reciprocating motion, and actuated by the fluid under initial pressure, a plunger forming the bottom of the mold and a fluid-pressure device for said plunger controlled by the fluid under reduced pressure to cause a discharge of the article from the mold, substantially as shown and described.

18. A fluid-pressure press provided with a fixed platen and a mold movable toward and from the platen for pressing the material under initial pressure of the fluid, a plunger forming the bottom of the mold, a controlling device for said plunger actuated under reduced pressure of the fluid to cause a discharge of the article from the mold at the time the mold moves into a lowermost position, a filling-receptacle for filling the mold and carrying a pusher for moving the article from the plunger and mold, and a controlling device for the said filling-receptacle and actuated by the fluid under reduced pressure, substantially as shown and described.

19. A fluid-pressure press provided with a fixed platen, a mold movable to and from said platen for pressing the material under initial pressure of the fluid, a plunger forming the bottom of the mold, a fluid-pressure device for said plunger actuated under reduced pressure of the fluid to cause a discharge of the article from the mold at the time the mold moves into a lowermost position, a filling-receptacle for filling the mold and carrying a pusher for moving the article from the plunger and the mold, a second fluid-pressure device for actuating the said filling-receptacle under reduced pressure of the fluid to move the said receptacle forward, and means for controlling the exhaust of the said second fluid-pressure device from the said receptacle, substantially as shown and described.

20. A fluid-pressure press, provided with a fixed platen, a mold movable to and from said platen, a plunger forming the bottom of the mold, a fluid-pressure device for said plunger, to cause a discharge of the article from the mold at the time the mold moves into a lowermost position, a filling-receptacle for filling the mold and carrying a pusher for moving the article from the plunger and the mold, the said receptacle controlling the exhaust of said fluid-pressure device, a second fluid-pressure device for actuating the said filling-receptacle to move the latter forward and means for controlling the exhaust of the said second fluid-pressure device from the said receptacle, substantially as shown and described.

21. A fluid-pressure press, provided with a fixed platen, a mold movable to and from said platen, a device actuated by a fluid under initial pressure and controlling said mold to press the material, a plunger forming the bottom of the mold, a fluid-pressure device for said plunger controlled by the fluid under reduced pressure, to cause a discharge of the article from the mold at the time the mold moves into a lowermost position, a filling-receptacle for filling the mold and carrying a pusher for moving the article from the plunger and the mold, a second fluid-pressure device for actuating the said filling-receptacle, to move the latter forward, means for controlling the exhaust of the said second fluid-pressure device from the said receptacle, and a rope and weight for returning said receptacle, substantially as shown and described.

22. A fluid-pressure press provided with a fixed platen, a mold movable to and from said platen, a plunger forming the bottom of the mold, a fluid-pressure device for said plunger to cause a discharge of the article from the mold at the time the said mold moves into a lowermost position, a filling-receptacle for filling the mold and carrying a pusher for moving the article from the plunger and the mold, said receptacle controlling the exhaust of said fluid-pressure device, a second fluid-pressure device for actuating the said filling-receptacle to move the latter forward, means for controlling the exhaust of the said second fluid-pressure device from the said receptacle, and means for returning said receptacle, substantially as shown and described.

23. A fluid-pressure press, provided with a hopper containing the material to be pressed into articles, a mold and platen for pressing the material into the articles, a device controlled by a fluid under initial pressure and controlling said mold, to press the material under initial pressure, a filling device operating between said hopper and said mold, to carry a measured quantity of the material to the mold at a time, and a device connected with said filling device and controlled by the fluid under reduced or expansion pressure, substantially as shown and described.

24. A fluid-pressure press provided with a primary pressing device controlled by the fluid under initial pressure, a filling-receptacle for carrying the material to the pressing device, and a controlling device for the filling-receptacle and actuated by the fluid under reduced pressure, substantially as shown and described.

25. A fluid-pressure press, provided with a hopper, a mold, a filling device for carrying a measured quantity of material from the hopper to said mold, a device controlled by the fluid under initial pressure for pressing the material, and a device controlled by the fluid under reduced pressure and connected with said filling device, to move the latter from the hopper to the mold, substantially as shown and described.

26. A fluid-pressure press, provided with a hopper, a mold, a filling device for carrying a measured quantity of material from the hopper to said mold, a device controlled by the fluid under initial pressure for pressing the material, a device controlled by the fluid under reduced pressure and connected with said filling device, to move the latter from the hopper to the mold, and a return mechanism for said filling device, substantially as shown and described.

27. A fluid-pressure press, provided with a primary pressing device controlled by the fluid under initial pressure, a plurality of reservoirs for receiving and storing the fluid under reduced pressure, and secondary devices for the press and actuated by the fluid from the said reservoirs, substantially as shown and described.

28. A fluid-pressure press, provided with a primary pressing device controlled by the fluid under initial pressure, a plurality of reservoirs for receiving and storing the fluid under reduced pressure, secondary devices for the press and actuated by the fluid from the said reservoirs, and devices controlled by moving parts of the press, to control the passage of the fluid from said reservoirs to said secondary devices to actuate the latter, substantially as shown and described.

29. A fluid-pressure press, provided with a four-way valve having a valve-body provided with an inlet-pipe, an initial-pressure pipe, a reduced-pressure pipe, and an exhaust-pipe, and a valve-plug with three ports, and adapted to be turned to connect the inlet-pipe with the initial-pressure pipe, and the latter successively with the reduced-pressure pipe and the exhaust-pipe, substantially as shown and described.

30. A fluid-pressure press, provided with a four-way valve having an initial-pressure side and a reduced-pressure side and a controlling device therefor, and comprising a cylinder having connection with the initial-pressure side and the reduced-pressure side of said four-way valve, a piston-stem for operating the plug of said four-way valve, and two pistons on said stem in said cylinder, one piston being movable on the stem and the other fixed thereon, a support carried by the piston-stem on which the movable piston is adapted to rest, the movable piston being moved to a seat by pressure from the initial-pressure side of the valve and the fixed piston being acted on by pressure from the reduced-pressure side of said valve, substantially as shown and described.

31. A fluid-pressure press, provided with a four-way valve having an initial-pressure side and a reduced-pressure side and a controlling device therefor, and comprising a cylinder having connection with the initial-pressure side and the reduced-pressure side of said four-way valve, a piston-stem for operating the plug of said four-way valve, two pistons on said stem in said cylinder, one piston being movable on the stem and the other fixed thereon, a support for the movable piston and carried by the piston-stem, the movable piston being moved to a seat by pressure from the initial-pressure side of the valve and the fixed piston being acted on by pressure from the reduced-pressure side of the valve, and a ring-seat in said cylinder between said pistons, for the movable piston to be seated on, substantially as shown and described.

32. A fluid-pressure press, provided with a four-way valve having an initial-pressure side and a reduced-pressure side and a controlling device therefor, and comprising a cylinder having connection with the initial-pressure side and the reduced-pressure side of said four-way valve, a piston-stem for operating the plug of said four-way valve, two pistons on said stem in said cylinder, one piston being movable on the stem and the other fixed thereon, a support on said stem on which the movable piston is adapted to rest, the movable piston being moved to a seat by pressure from the initial-pressure side of the valve and the fixed piston being acted on by pressure from the reduced-pressure side of the valve, a ring-seat in said cylinder between said pistons, for the movable piston to be seated on, and an auxiliary reservoir having connection with said cylinder, for passing a fluid under reduced pressure into the cylinder under the fixed piston, to return the same and the stem to a normal position, substantially as shown and described.

33. A fluid-pressure press, provided with a four-way valve having an initial-pressure side and a reduced-pressure side and a controlling device therefor, and comprising a cylinder having connection with the initial-pressure side and the reduced-pressure side of said four-way valve, a piston-stem for operating the plug of said four-way valve, two pistons on said stem in said cylinder, one piston being movable on the stem and the other fixed thereon, a support secured to the stem and on which the piston is adapted to rest, the movable piston being moved to a seat by pressure from the initial-pressure side of the valve and the fixed piston being acted on by pressure from the reduced-pressure side of the valve, a ring-seat in said cylinder between said pistons, for the movable piston to be seated on, and an exhaust-valve for said cylinder and controlled by arms on said stem, substantially as shown and described.

34. A fluid-pressure press, provided with a storage-reservoir, a filling-receptacle mounted to slide, a cylinder connected with said storage-reservoir, a piston in said cylinder and connected with said filling-receptacle, and an auxiliary reservoir connected with said cylinder, substantially as shown and described.

35. A fluid-pressure press, provided with a storage-reservoir, a filling-receptacle mounted to slide, a cylinder connected with said storage-reservoir, a piston in said cylinder and connected with said filling-recptacle, a valve in the connection between the reservoir and the cylinder, a movable mold adapted to be filled from said receptacle and controlling said valve, and an auxiliary reservoir connected with said cylinder near one end thereof, substantially as shown and described.

36. A fluid-pressure press, provided with a storage-reservoir, a filling-receptacle mounted to slide, a cylinder connected with said storage-reservoir, a piston in said cylinder and connected with said filling-receptacle, a valve in the connection between the reservoir and the cylinder, and an auxiliary reservoir connected with said cylinder near one end thereof, so that on the forward movement of the piston the fluid from the cylinder can pass into said auxiliary reservoir, substantially as shown and described.

37. A fluid-pressure press, provided with a storage-reservoir, a filling-receptacle mounted to slide, a cylinder connected with said storage-reservoir, a piston in said cylinder and connected with said filling-receptacle, a valve in the connection between the reservoir and the cylinder, an exhaust-valve controlled by said slidable filling-receptacle to exhaust the fluid from said cylinder for the return of the piston and an auxiliary reservoir connected with said cylinder, substantially as shown and described.

38. A fluid-pressure press, provided with a storage-reservoir, a filling-receptacle mounted to slide, a cylinder connected with said storage-reservoir, a piston in said cylinder and connected with said filling-receptacle, a valve in the connection between the reservoir and the cylinder, an exhaust-valve controlled by said slidable filling-receptacle to exhaust the fluid from said cylinder for the return of the piston, an auxiliary reservoir connected with said cylinder, and adapted to receive the fluid from the cylinder on the forward movement of the piston and a return mechanism for said filling-receptacle and piston, substantially as shown and described.

39. A fluid-pressure press, provided with a storage-reservoir, a filling-receptable mounted to slide, a cylinder connected with said storage-reservoir, a piston in said cylinder and connected with said filling-receptacle, a valve in the connection between the reservoir and the cylinder, and exhaust-valves for said cylinder and said storage-reservoir and simultaneously controlled from said filling-receptacle, substantially as shown and described.

40. A fluid-pressure press, provided with primary devices for pressing the material under initial pressure of the fluid, a storage-reservoir arranged to receive the fluid under reduced pressure from the primary devices, a filling-receptacle mounted to slide, a cylinder connected with said storage-reservoir, a piston in said cylinder and connected with said filling-receptacle, and a valve in the connection between the storage-reservoir and the cylinder, substantially as shown and described.

41. A fluid-pressure press provided with a pressing device controlled by the fluid under initial pressure, a valve for admitting the fluid to said device, a controlling device for said valve, a reservoir adapted to receive the fluid under reduced pressure, and a connection between the said reservoir and the controlling device for the valve, whereby the motive agent can pass from the reservoir to the controlling device to reset the same and the said admission-valve, substantially as shown and described.

42. A fluid-pressure press, provided with an auxiliary reservoir, a filling-receptacle for the mold, an admission-valve for the fluid for actuating the pressing devices, a controlling device for said admission-valve, and a valved connection between the said controller and the said auxiliary reservoir, to permit the motive agent to pass from the auxiliary reservoir to the controller for resetting the same and the said admission-valve, the valve in the said connection being controlled by the said filling-receptacle, substantially as shown and described.

43. A fluid-pressure press, provided with a mold having a reciprocating motion, a plunger forming the bottom for said mold, a cylinder connected with a pressure-supply, a piston in said cylinder, a piston-rod extending from said piston to form a resistance for said plunger and hold the latter temporarily stationary at the time the mold descends, for discharging the pressed article from the mold, a slidable filling-receptacle and pusher for removing the finished article from the plunger and mold and for filling the latter, and an exhaust-valve for said cylinder and opened from said receptacle at the time the pusher removes the finished article and previous to the filling-receptacle registering with the mold, to allow the plunger and piston to move back to their lowermost positions, substantially as shown and described.

RUDOLPH RUETSCHI.

Witnesses:
H. J. SMITH,
J. A. MIDDLEKAUFF.